United States Patent
Osipova

(10) Patent No.: US 9,411,801 B2
(45) Date of Patent: Aug. 9, 2016

(54) GENERAL DICTIONARY FOR ALL LANGUAGES

(71) Applicant: Maria Osipova, Moscow (RU)

(72) Inventor: Maria Osipova, Moscow (RU)

(73) Assignee: ABBYY Development LLC (RU)

( * ) Notice: Subject to any disclaimer, the term of this patent is extended or adjusted under 35 U.S.C. 154(b) by 732 days.

(21) Appl. No.: 13/725,095

(22) Filed: Dec. 21, 2012

(65) Prior Publication Data

US 2014/0180670 A1   Jun. 26, 2014

(51) Int. Cl.
*G06F 17/28* (2006.01)
*G06K 9/00* (2006.01)
*G06K 9/68* (2006.01)
*G06F 17/27* (2006.01)

(52) U.S. Cl.
CPC ............ *G06F 17/276* (2013.01); *G06F 17/289* (2013.01); *G06K 9/00671* (2013.01); *G06K 9/6842* (2013.01)

(58) Field of Classification Search
CPC   G06F 17/289; G06F 17/2836; G06F 17/2735
See application file for complete search history.

(56) References Cited

U.S. PATENT DOCUMENTS

| | | | | |
|---|---|---|---|---|
| 6,047,251 A * | 4/2000 | Pon | ...................... | G06K 9/6807 382/229 |
| 6,393,443 B1 * | 5/2002 | Rubin | ..................... | G06F 17/22 715/236 |
| 6,480,838 B1 * | 11/2002 | Peterman | ........... | G06K 9/00865 |
| 7,092,567 B2 * | 8/2006 | Ma | .......................... | G06K 9/723 382/177 |
| 7,496,230 B2 * | 2/2009 | Chen | ...................... | G06F 9/543 382/182 |
| 8,751,214 B2 * | 6/2014 | Kato | .................... | G06F 17/2863 345/467 |
| 2001/0032070 A1 * | 10/2001 | Teicher | ................... | G06F 17/28 704/2 |
| 2001/0056342 A1 * | 12/2001 | Piehn | ..................... | G06F 17/289 704/3 |
| 2003/0202683 A1 * | 10/2003 | Ma | ................... | G08G 1/096716 382/104 |
| 2004/0210444 A1 * | 10/2004 | Arenburg | .............. | G06F 17/275 704/277 |
| 2004/0260535 A1 * | 12/2004 | Chen | ....................... | G06F 9/543 704/9 |
| 2009/0063129 A1 * | 3/2009 | Tsai | ....................... | G06K 9/228 704/3 |
| 2009/0067756 A1 * | 3/2009 | Meyer | ...................... | G06K 9/03 382/310 |
| 2009/0285492 A1 * | 11/2009 | Ramanu-japuram | ........... | G06F 17/30244 382/209 |
| 2010/0049752 A1 * | 2/2010 | Chiu | ........................ | G06F 17/28 704/7 |
| 2010/0278453 A1 * | 11/2010 | King | ....................... | G06Q 10/10 382/321 |
| 2012/0323707 A1 * | 12/2012 | Urban | ..................... | G06Q 30/06 705/15 |
| 2013/0030789 A1 * | 1/2013 | Dalce | ..................... | G06F 17/289 704/2 |
| 2013/0103383 A1 * | 4/2013 | Du | ......................... | G06F 17/289 704/3 |
| 2013/0108162 A1 * | 5/2013 | Kutsumi | .................. | G06K 9/03 382/182 |
| 2013/0253901 A1 * | 9/2013 | Krack | ................... | G06F 17/289 704/2 |
| 2013/0304742 A1 * | 11/2013 | Roman | ............. | G06F 17/30598 707/740 |
| 2014/0180671 A1 * | 6/2014 | Osipova | ................ | G06F 17/275 704/8 |

* cited by examiner

*Primary Examiner* — Matthew Baker
(74) *Attorney, Agent, or Firm* — LeighAnn Weiland; Veronica Weinstein

(57) ABSTRACT

Disclosed are implementations of methods and systems for displaying definitions and translations of words by searching for a translation simultaneously in various languages according to a query in a general language dictionary. The invention removes the need to specify a source language for the word or word combination when translated into a target language. The target language may be preset. Translation is possible for word combinations in multiple sources languages. Source words may be entered manually or captured by an imaging component of an electronic device. When captured, a word combination is selected, and subjected to optical character recognition (OCR) and translation. Source language and OCR language may be suggested via geolocation of the electronic device.

19 Claims, 9 Drawing Sheets

GENERAL DICTIONARY FOR ALL LANGUAGES

BACKGROUND OF THE INVENTION

1. Field

Embodiments are directed to finding, translating and displaying text such as search results from search engines and electronic dictionaries.

2. Related Art

Currently, there are many types of electronic bilingual dictionaries which provide translation from one chosen source language (e.g., German, Russian) into another target language (e.g., English, Arabic). There are also various online translators, dictionaries and other related language translation tools. A translation may be performed according to a particular subject domain (e.g., cooking, computer science, physics, medicine, art). Many dictionaries and translators have the substantial disadvantage of requiring the user to preliminarily set a source language and a target language of the electronic dictionary before initiating the translation. However, difficulties may arise when the user lacks knowledge of the source language of a particular word or words or does not take the time to make such selection. Consequently, in order to find a word from an unknown source language, consecutive searches in many or all available bilingual dictionaries must be performed. Such consecutive searches are impractical and time consuming.

SUMMARY

The disclosed invention relates to implementations of methods and systems for displaying definitions and translations of words or word combinations, by searching for a translation simultaneously in several or all available languages according to a request or query in a general electronic language dictionary. The invention removes the need to specify a source language for a particular (selected) word or word combination to be translated into a target language. Furthermore, a target language may be preset by a user in a setting of the electronic dictionary or software application. Alternatively, the target language may identified automatically by the application. The resulting translation or word list from the general dictionary may be augmented and expanded.

Translation is possible for word combinations in multiple sources languages. Source words may be entered manually or captured by an imaging component of an electronic device. When captured, a word combination is selected, and subjected to optical character recognition (OCR) and translation. Source language and OCR language may be suggested via geolocation of the electronic device.

This Summary introduces a non-exclusive selection of aspects or concepts about the present invention in a simplified form that are further described below in the Detailed Description. This Summary is not intended to identify key or essential features of the claimed subject matter, and is not intended to be used to limit the scope of the claimed subject matter.

BRIEF DESCRIPTION OF THE DRAWINGS

While the claims set forth the enforceable bounds of the present invention with particularity, the invention, together with its objects and advantages, will be more readily appreciated from the following detailed description, taken in conjunction with the accompanying drawings. Throughout, like numerals refer to like parts with the first digit of each numeral generally referring to the figure which first illustrates the particular part.

DETAILED DESCRIPTION

Figure 1:
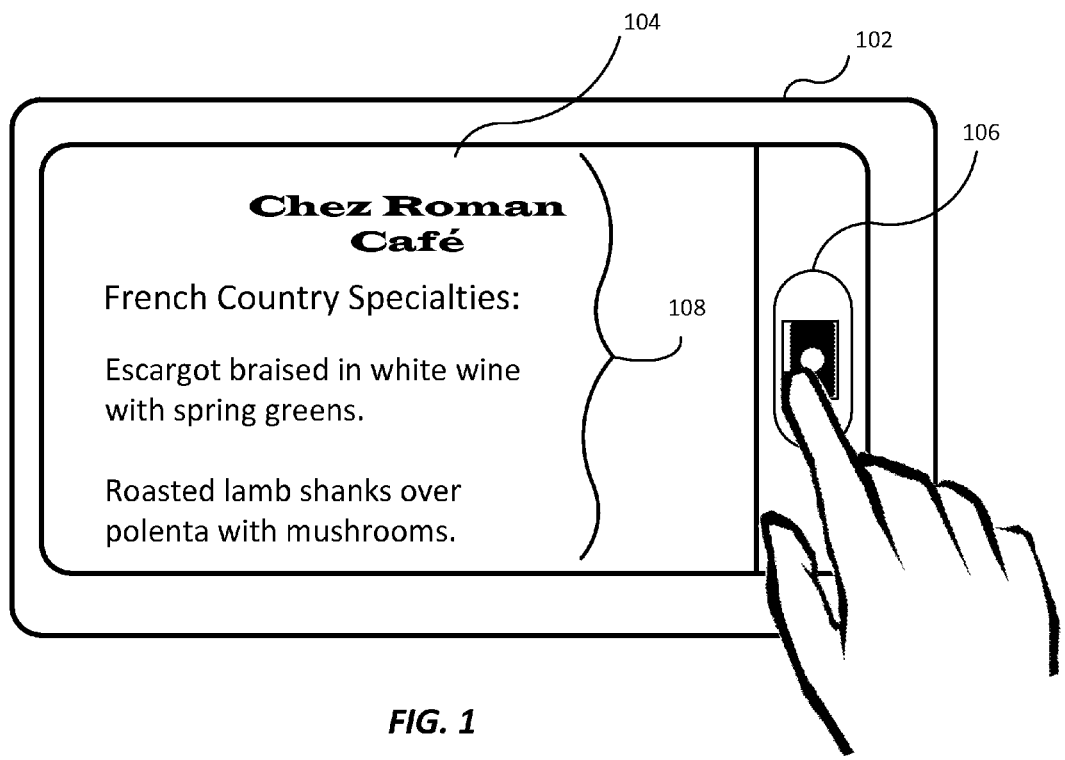
FIG. 1 shows an exemplary screen and electronic device, in accordance with an embodiment for practicing the present disclosure.

There is a plethora of portable electronic devices such as laptops, tablet computers, smart-phones, mobile phones, personal digital assistants (PDAs), and personal computers (PC). The disclosed invention allows such mobile or portable electronic devices to access and operate an electronic dictionary or related application(s) and perform a meaningful translation of text in any one or more source languages without specifying the direction of translation, namely without specifying the source language(s). The target language may be preliminarily chosen by a user or detected automatically. For example, a default target language for translation could be set to a native language of the user (such as through a default setting of a software application or for an electronic device on which the software application operates).

Many modern portable electronic devices have enough computer resources to support the use of electronic dictionaries installed and operated locally or operated partially or fully on a network accessible device. Dictionaries on a network accessible device may be accessed over networks, standards and protocols such as the Internet, WiFi, Zigbee, Bluetooth, etc.

Advantageously, the present invention enables a user to translate an individual word or word combination into one or more target languages by using a general language dictionary without preliminarily specifying a source language.

In a preferable implementation, the method comprises starting an electronic dictionary application (if it is not already operating on the device), photographing a text (e.g., word, expression, word combination, sentence), detecting a selection of a word or word combination to be translated, performing optical character recognition (OCR) of the selected text, looking up the recognized word or word combination in a general electronic dictionary simultaneously in various languages and displaying an abridged version of one or more relevant entries or variants. Subsequent processing, display and the like may be performed.

In an alternative embodiment, the method comprises starting an electronic dictionary application (if it is not already operating on the device), and manually or verbally entering the word or word combination, for example, with the help of a real or virtual keyboard or microphone. Next, the method comprises performing a search of the input word or word combination in a general electronic dictionary simultaneously in a variety or plurality of languages and then displaying an abridged version of one or more relevant entries or translation variants.

The general dictionary may comprise a software program and, for example, a set of bilingual dictionaries. The software program may include a shell, which provides a graphical user interface (GUI), morphology models to display inflected forms, context search that uses an index, a teaching module, etc. The dictionary may be independently stored in different locations including in the computer device or on a server in a local area network (LAN) or a wide area network (WAN) and made available through one or more protocols.

Generally, for purposes of recognizing text in a photographic image, a user's electronic device may include optical character recognition (OCR) or intelligent character recognition (ICR) algorithms, technology or functionality. OCR and/or ICR functionality may be installed locally in the electronic device or may be operated and made available at one or more accessible devices.

An OCR system as used herein means at least to transform images or representations of characters, words, word combinations, sentences and the like in paper documents (photos) into computer-readable and computer-editable and searchable electronic files. A typical OCR system includes an imaging device or component that produces the document images and software that processes the images. As a rule, this software includes an OCR program or set of algorithms that can recognize symbols, letters, characters, digits, and other units and save them into a computer-editable format—an encoded format.

An electronic device may be provisioned with software that includes a client dictionary application to implement techniques disclosed herein. The application may include one or more local dictionaries for each language. An electronic device may also include or have access to a set of bilingual dictionaries.

Referring to FIG. 1, an electronic device 102 comprises a display screen 104. Also, the electronic device may be equipped with a camera button (real or virtual) 106 for capturing an image of text 108. The electronic device 102 may comprise a general purpose computer embodied in different configurations such as a mobile phone, smart-phone, cell phone, personal computer, tablet computer, laptop computer or any other gadget or combination of devices including those that have a screen and/or camera. A camera allows capture and conversion of information to a digital form. The information may be in paper form (e.g., magazine, book, newspaper), or on a screen of another device.

Figure 2:
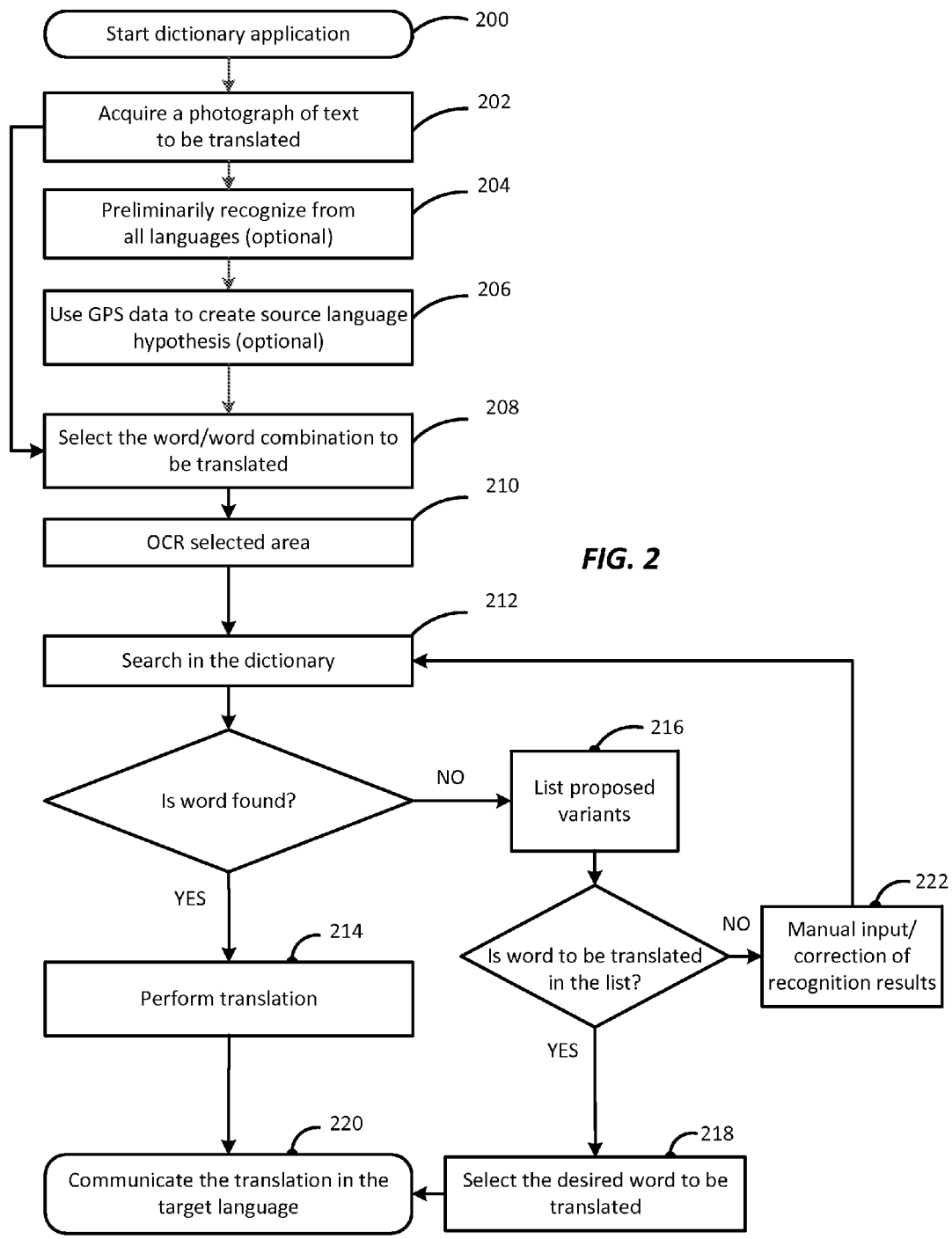
FIG. 2 shows a flowchart of operations in accordance with an embodiment of the present disclosure according to one scenario for entering a word by capturing a photograph or image and performing a subsequent recognition and translation.
Figure 3:
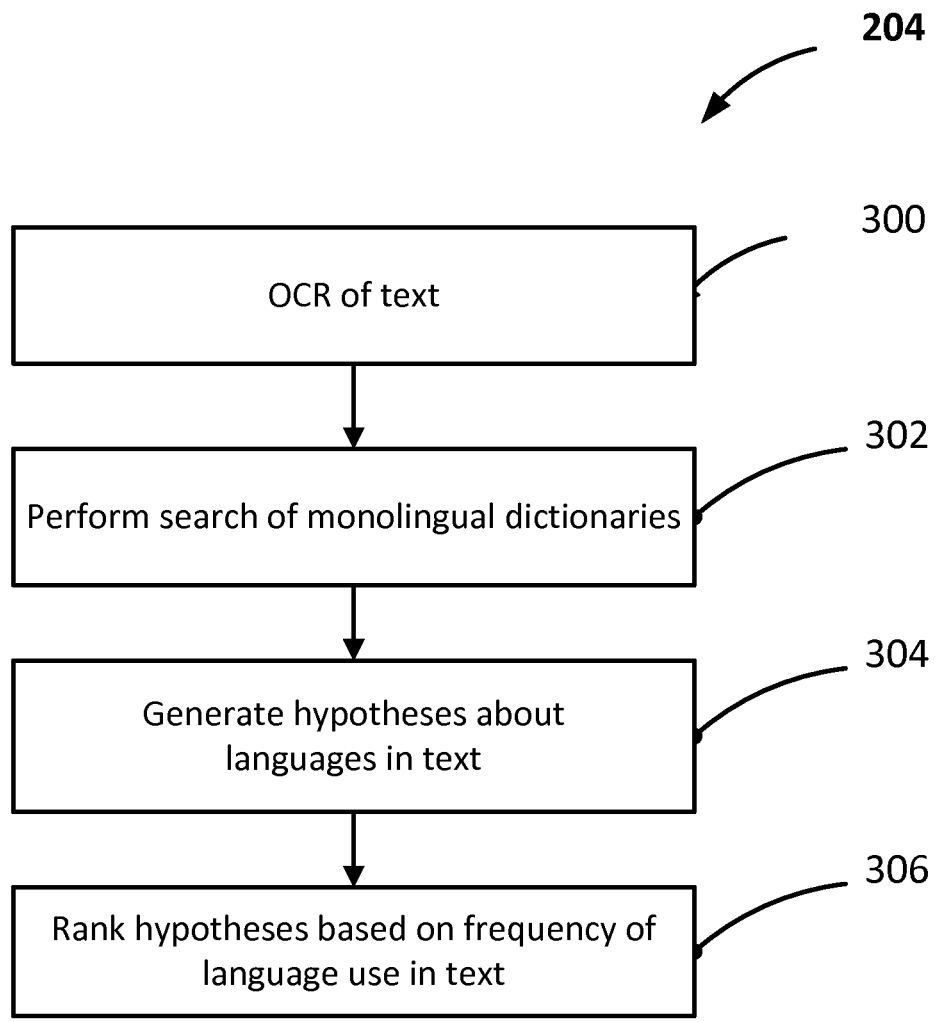
FIG. 3 shows a flowchart of operations in accordance with an embodiment for determining one or more source languages for performing recognition based on a preliminary recognition of a source text and performing searches in monolingual dictionaries.
Figure 4:
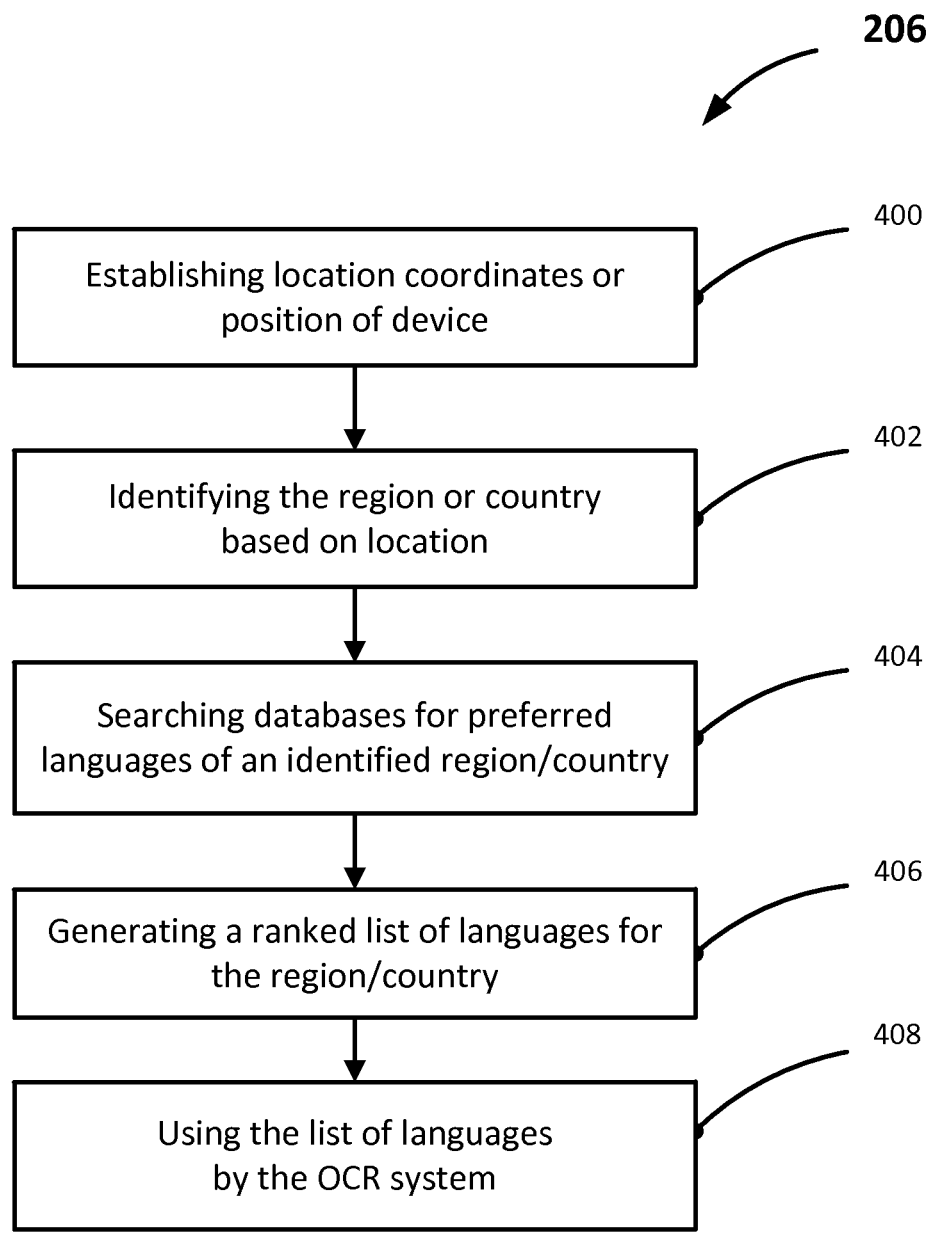
FIG. 4 shows a flowchart of operations in accordance with an embodiment of the invention for determining one or more source languages for recognition based on geo-location data.
Figure 5:
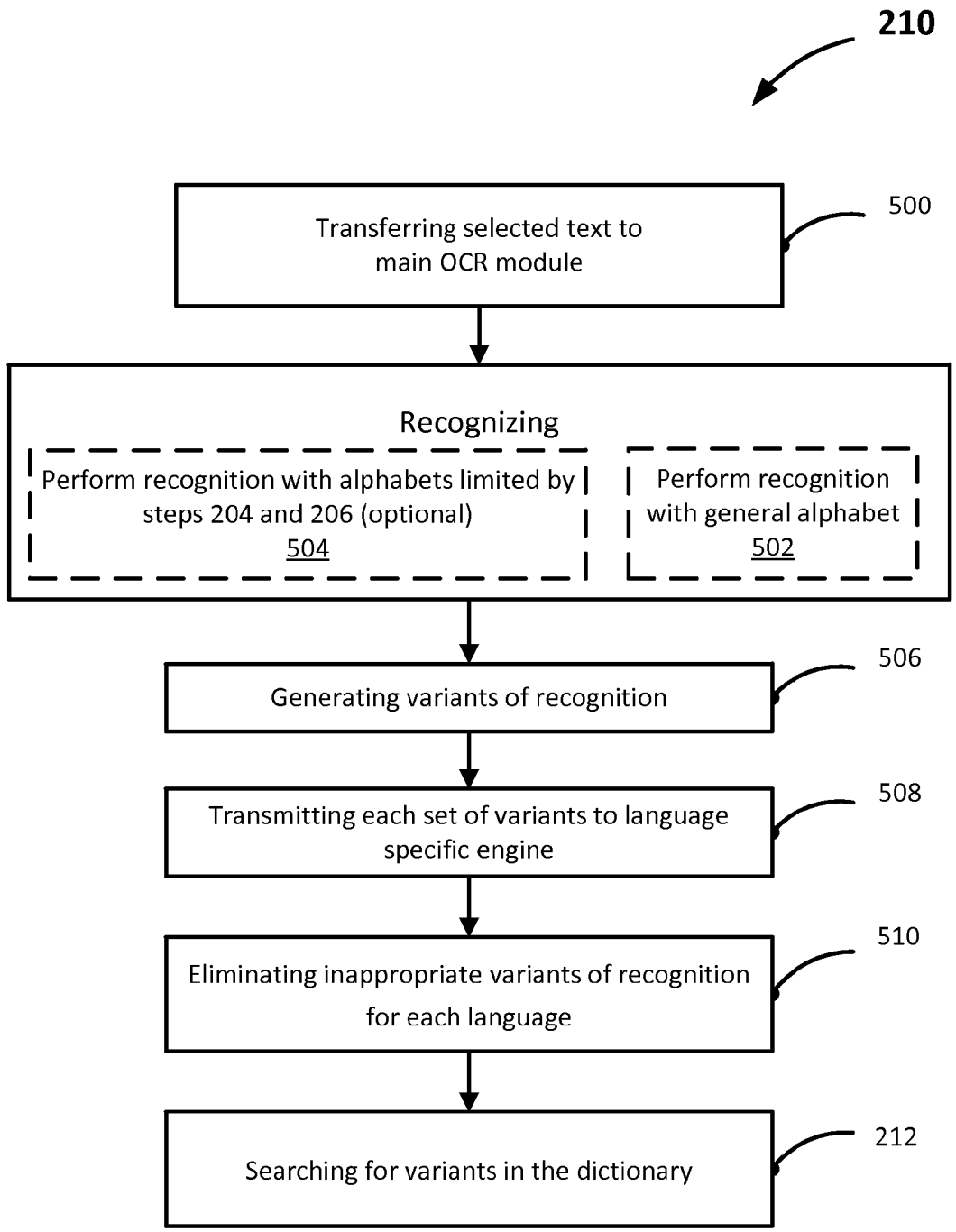
FIG. 5 shows a flowchart of operations in accordance with an embodiment of the invention for recognizing a selected text by an optical character recognition (OCR) function or module.

FIG. 2, FIG. 3 and FIG. 4 demonstrate flowcharts of operations according to different embodiments of the disclosed invention. Referring to FIG. 2 there is shown a method or flowchart of operations performed by logic or one or more software algorithms or applications, in accordance with a preferable embodiment of the invention. This preferable embodiment includes entering a word or expression to be translated by capturing it with camera that is built into an electronic device. The method includes starting or launching an electronic dictionary application 200 (if it is not already operating on the device).

Next, acquiring the text-based image containing a word or word combination to be translated is performed at step 202. The text-based image may be obtained by taking a photograph with a camera of the electronic device. The camera may be operated from the inside of dictionary application. Once the device detects a user command for taking a photo, a viewfinder related to the camera is started and the user may trigger capture of an image by actuating a real or virtual button. Alternatively, a text-based image may be acquired from the memory storage of the electronic device.

This embodiment is connected with usage of OCR technologies. OCR software or functionality is applied to the text-based image. The image may be sent to a server where an OCR system is operational. The result of OCR processing is a word or word combination represented by a string of characters. As part of the OCR functionality of the invention, morphology dictionaries may be used, as higher OCR accuracy and improved error correction are achieved by comparing the recognition results with similar word forms in one or more morphology dictionaries. The morphology dictionaries may be used in conjunction with the OCR and translation functions.

At the step 204, preliminary recognition (pre-recognition) of the entire text-based image is performed and the most probable language or languages of the text are determined. Presetting the language of recognition by the user may not always be possible as the user will often lack the ability to recognize the language of the word to be translated. The step 204 is optional and may be skipped. At step 300, the OCR functionality recognizes some or the entire text-based image and analyzes characters and character sets (words) that occur in an image. At step 302, a search of monolingual dictionaries is performed on the recognized words.

At step 304, the analysis formulates several hypothesizes $H_1, \ldots, H_n$ for the language of or in the text. For example, when most of the preliminary recognized words are found in the German dictionary, it is assumed that German is most likely the main language of the document. When a text is multilingual, words or word combinations from several languages may occur in the text. For example, in multilingual text, hypothesis $H_1$ corresponds to the assumption that the language of a text is English, hypothesis $H_2$ corresponds to the assumption that the language of a text is German, and so on.

At step 306, the frequency of occurrence of words from each language is calculated and used to rank the language hypotheses. Based on this statistical data possible languages of a document are arranged in according to the frequency of occurrence of its words. For example, if the frequency of occurrence of German words is the highest, so the priority of German language is on the top of the rank. Next based on the lesser frequency of occurrence of words from another language, for example from French language, French language will take the second position in this rank. And so on.

In addition to language detection based on the preliminary recognition of optional step 204, there is another method, at step 206, of automatic language detection based on available geo-location data. The use of geo-location data for language determination is possible on devices equipped with navigation functionality such as GPS, GLONASS, GSM, GDMA and other analogical modules, Wi-Fi adapters and so on. For example, if the device determines its location as being in France, the system may identify French as a first possible or preferred language for recognition.

Referring to FIG. 4, there is shown a method or flowchart of operations performed by logic or one or more software algorithms or applications, in accordance with a determination of the language of text to be recognized based on geo-location data. The language determination result is used in the processes related to performing OCR of the text-based image. The method includes establishing the coordinates of location of a device by a navigation module (e.g., logic, application, instructions) at step 400. The navigation module includes logic for requesting and receiving location data from another device such as a network server that tracks the location of a mobile device that is performing translation.

Next, at step 402, a correspondence between the acquired coordinates of the device and the particular country or region is established. The system establishes the correspondence by searching appropriate correspondence tables or databases using the acquired coordinates.

Next, at step 404, the country or region detected at step 402 is used for searching in other databases or correspondence tables to determine a list of languages that are used or preferred in the particular country or region corresponding to the current location of the device performing the recognition. Next, at step 406, hypotheses $L_1, \ldots L_n$ of the languages spoken in the identified region, which may be used for recognition, are formulated.

At step 408, the languages identified at step 406 are added to a list of languages for use by the recognition and other OCR functionalities. In this way, a list of languages is proposed by the system based on geo-location data. In one embodiment, languages in the list of this type may be ranked according to how widely each language is used in the identified region or country. For example, the most widely used language should take first place in the list and should be suggested as the most probable language for recognition. For example, suppose that at step 402 the system determines that the geo-location of the electronic device (user) is Belgium (Kingdom of Belgium). According to a correspondence table there are three official languages in Belgium: French, Dutch and German. Also, there are regional languages: West Flemish, East Flemish, Brabantian, Limburgish, Walloon, Picard, Champenois, Lorrain, and Low Dietsch. However, the most spoken language is Dutch. So, in the described list of languages for recognition, Dutch would take the first place as the most commonly used language in Belgium. Any variety of data, metrics and preferences may be combined with the geo-location data to sort and arrange a list of languages to be used for recognition. One example of such other data may be a set of historical geo-location data. For example, if a traveler is fond of traveling to and staying in French speaking regions or countries (prior to entering Belgium), the list of languages for the particular device (and user) may be rearranged so that French appears as the first or preferred language for recognition.

Moreover, the system can store the history of previous sessions using the general dictionary which includes information about languages of recognition and source languages of translation performed successfully. Using this information the system can, with regard to data about previous sessions, propose source language hypotheses or help rank already generated hypotheses. For example, if during the previous session it was determined that the source language was German, the German language is promoted in the rank of possible languages for recognition.

Next, with reference again to FIG. 2, at step 208, the electronic device detects a user selection of a particular word or word combination within the text-based image to be translated. The electronic device is configured to detect a user selection action using a finger, stylus, cursor, or in another suitable manner or by using a verbal indication.

Next, at step 210, the user selected word(s) or word combinations are recognized using an algorithm of recognition with OCR module. At step 500, the user selected word or word combination is transmitted to the recognition or OCR module. A default source language for recognition need not be set prior to performing recognition. At step 502, according to one embodiment, recognition of a word or word combination may be performed based on a general or composite alphabet, which contains all possible characters of each language in the general dictionary. The selected word or word combination may be recognized more accurately and efficiently using a pre-determined priority of language(s) detected during pre-recognition at steps 204 and 206. Therefore in the preferred embodiment, at optional step 504, the recognition may be performed based on an alphabet that contains only characters from languages present in the text-based image as determined by the preliminary recognition at step 204 and/or geo-location analysis at step 206.

At step 506, the recognition process generates recognition results in the form of recognition variants $\{V_1, V_2, \ldots, V_n\}$ of the selected word or word combination. Where $V_1$ represents the first possible recognition variant; $V_2$ represents the second recognition variant; $V_3$ represents the third recognition variant.

At step 508, each set of variants $V_1, V_2, \ldots, V_n$ is transmitted to a language specific processor purposed for analyzing all proposed recognition variants in a given language. It is possible to determine the language of a recognition variant by analyzing specific symbols and characters that are unique to one or a few languages. One such class of symbols is called diacritical marks (e.g., diacritical point, diacritical sign). For example, in the German language characters such as "ä", "ö", "ü", "β" are unique, in the French language—"é", "à", "ç" are unique, and in the Dutch language—"ø", "æ", "å" are unique. Analyzing the recognition variant for the presence of diacritical marks can constrain the range of possible languages of the source word. The analysis may also consist of comparing the alphabetic characters in each recognition variant (where each variant is a set of a recognized letters, i.e., a word, expression, word combination) with the alphabetic characters of the language corresponding to the language specific processor.

At step 510, the language specific processor detects language specific characters and symbols and eliminates language inappropriate recognition variants. For example, a language specific processor for German will analyze variants $V_1, V_2, \ldots, V_n$ and detect the presence of characters and symbols that occur in the German language and removes recognition variants which do not contain German characters or symbols. After analysis by the first language specific processor, the set of recognition variants is transmitted to a second processor for another language, for example French. This process repeats for every available language processor until each recognition variant is checked by each processor.

At step 212, after inappropriate recognition variants are eliminated by a language specific processor the remaining variants are searched for in the relevant language dictionary. For example, the remaining variants reported by the German processor $\{V_1, V_3, V_5\}$ are transmitted to the German dictionary which is included in a general dictionary. The dictionary is searched for the presence of the remaining variants. If one of these variants $\{V_1, V_3, V_5\}$ is found in the German dictionary it is to be translated.

A processed at step 214 query is passed to a general dictionary for searching an appropriate translation of each variant into a target language. Also, a morphological analysis may be performed. The base form of the user selected word is identified. Substantially simultaneously, the look up of the word/word combination in the general dictionary is performed.

The target language for translation may be preliminarily preset by user, may be selected as a default language until a user changes it or may be detected automatically based on the language of user interface of an electronic device. For example, the target language may be English by default. Some target languages may be also selected. In this case, the translation is made into two or more target languages. If the user desires two foreign languages, it is useful for him/her to look up variants of translation in two different languages substantially simultaneously because entries of dictionaries for different languages may have slightly different content. One entry for a certain word may contain more detailed information with examples that are more helpful than the other entry or entries from the second target language.

Because one word may have different variants of translation depending on its part of speech (noun, verb, objective), analyzing of the neighboring words, i.e., words to the left and to the right of the base word may be performed. This option allows to establish part of speech of a selected word, and consequently considerably reduce a list of variants of translation by offering only those translation variants whose part of speech correspond to the part of speech of a base word in a source language. For example, if a translation system establishes that the selected word is a noun, it will offer only nouns as variants of translation. This option helps to save time, storage or memory space, bandwidth, etc.

In the case when there is no word or word combination to be translated in the general dictionary, the system proposes at the step 216 a list of words or word combinations that are similar in spelling to the recognized variants of a desired word or word combination. If the user is satisfied with the proposed variants, the user can select one of them at step 218. After that, a translation into a target language is subsequently displayed at the step 220. Otherwise, at step 222, a user may have an opportunity to input words from a keyboard, microphone or other input device of the electronic device or correct the result of recognition.

At step 220, the translation and (or) meaning of the user selected word or word combination is communicated to the user and saved for later access. In one embodiment the translation is displayed on the screen of the device. In another embodiment the translation is communicated though an audio feature using a headset or the speakers of the electronic device. If the translation is displayed on a device equipped with a touch-screen, the translation may be displayed in a balloon, pop-up window, as a subscript, as a superscript, or in any other suitable manner when the user touches a word on the display. Furthermore, the dictionary entry include may include information about the source langue and other possible definitions.

Figure 6:
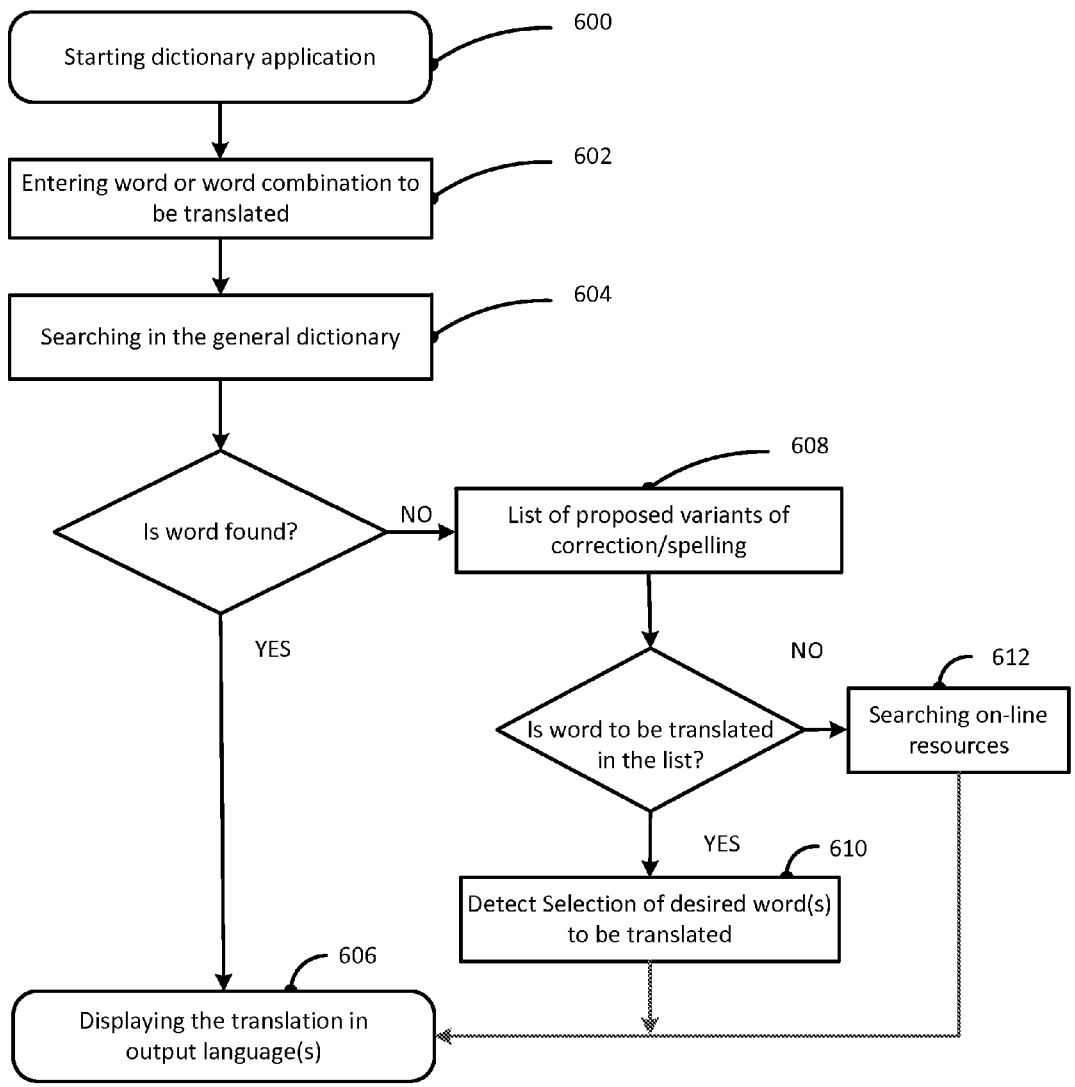
FIG. 6 shows a flowchart of operations in accordance with an embodiment of the present disclosure for manual entry of text for finding translation variants.

Referring to FIG. 6, there is shown a method or flowchart of operations performed by logic or one or more software algorithms or applications, in accordance with an alternative embodiment of the invention. The invention includes entering the word with which to perform a dictionary search or query using a graphical user interface (GUI). The method includes starting or launching an electronic dictionary application at step 600 if not already executing. Next, at step 602, the user enters a word or word combination to be translated. The search string may be entered using any input method. Search entry may be through a GUI or window or field associated with the GUI in which a search string may be entered.

In one embodiment, a user may be given the opportunity to select or narrow a list of supported languages proposed for use of the general dictionary from a plurality of available languages. For example, a general dictionary may include words from 30 languages. However, if a user knows the exact source language, the user may make a selection in a GUI or indicate the settings of the electronic application the source language to be use for translation. For instance, the user may choose to use only ten European languages from a proposed list of 30 languages. Selecting a reduced set of languages saves resources of the electronic device operating the electronic dictionary (e.g., CPU processing, battery use).

The general electronic dictionary includes general linguistic morphologies. A general morphological module includes morphological modules for each of a plurality of translation languages. A general morphological module is able to identify specific words for particular languages.

Contemporaneously with the user entering letter-by-letter a word to be translated, a search in the wordlist is performed. If the first entered symbol is a character, the number of source languages is reduced and constrained such as by removing languages that use hieroglyphics (e.g., Chinese, Japanese, Vietnamese). On the contrary, if the first symbol is a letter, the subsequent search is performed on alphabet-based languages (e.g., Russian, English, German).

Responsive to entry of the search string in the manner described, the client dictionary application performs a search (also referred to as a "first search") of at least one source (also referred to as a "first source") of at least one source for information responsive to a query. The first source may include the local dictionaries. There is no need to specify the source language for translation.

At the step 604, the query is passed to the general dictionary that includes words or word combinations from all languages. Initially, at step 604, the search of the general dictionary is performed using the exact coincidence of word to be translated with word in general dictionary. Secondly, if the exact the coincidence of the word spelling is not found a search based on results of morphological processing is performed. Because the entered word or word combination may not be in the base, or "dictionary" form, the morphology module identifies the base form of an inflected form. If more than one base is are possible, the morphology module identifies the alternatives.

Finally, if the word is found in the general dictionary, its meaning/translation is communicated to the user in a target language at step 606. The translation may be displayed in a dictionary entry window and may contain information about the language to which the source word belongs.

When the word or word combination entry is not found in the general dictionary, at step 608, the system proposes the list of word or word combinations variants that are similar in spelling to the initial entry based on the of processing performed by the general morphological module. The list of proposed variants (words/word combinations) may include all the possible variants from all available languages in the dictionary. If the user is satisfied with the proposed variants, a user selection is detected at step 610.

Additionally, if an Internet connection is available (e.g., by Wi-Fi) at step 612, the user may be presented with an option to search in secondary resources (online resources over an Internet connection). For example, with the help of a shell or GUI element, a user can obtain translations from online dictionaries or other resources only upon clicking an appropriate link, for example, a user can select a link that says, "view entries from online dictionaries". Therefore, a user may immediately obtain translations and definitions found both in locally installed dictionaries and in online dictionaries or in other resources. If no entries are found in the local dictionaries or other local resources, entries from online dictionaries are displayed. Entries from online dictionaries may be shown in the same window as local entries or in one or more separate windows, bubbles, footnotes or other GUI element.

In one embodiment, entries from additional dictionaries may be shown as a link which allows the user to see these entries. The additional translations, which are found in "non-connected" dictionaries or other resources are shown by a link, for example, "more (online entries)>>." When the user presses or actuates the reference, additional translations or definitions are downloaded into a dictionary entry window (or other GUI element) for display to the user.

This method is especially useful for translation of a word/word combination or text if the source language is unknown or if a text is multilingual, for example menu in restaurants. The disclosed method reduces time required for translation, since a user does not need to open multiple windows of bilingual dictionaries on a screen, switch between them. User can capture the text and select a desired word or word combination to be translated. Such advantages are particularly useful also in devices with small screen (e.g. mobile devices) for saving space on the screen.

Figure 7A:
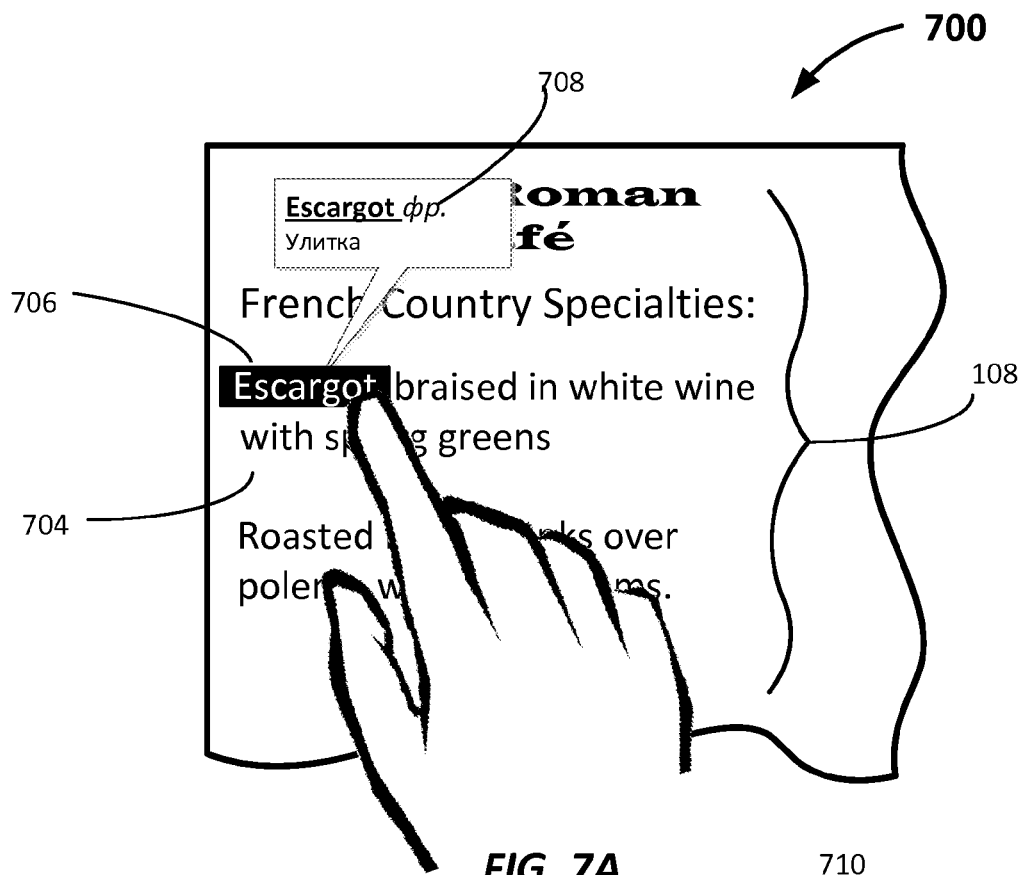
FIGS. 7A and 7B shows an example of a captured image with text in a plurality of languages (French and English), with a multi-lingual word combination selected.

FIG. 7A shows an example of a captured image 700 with text 108 in a plurality of languages (in this case, French and English), with a multi-lingual word combination 704 for translation. With reference to FIG. 7A, the text 108 includes a title ("Chez Roman Café"), a subtitle ("French Country Specialties"), and menu items. The multi-lingual word combination 704 ("Escargot braised in white wine with spring greens") includes French and English words. In particular, the word "escargot" 706 is a French word in French, a second source language, relative to the majority of the words around it (e.g., "French Country Specialties," "braised in white wine with spring greens" and "Roasted lamb shanks over polenta with mushrooms") in English, a first source language. (For now, this ignores that arguably some words from a second source language can be borrowed or adopted by the first source language and are therefore a part of the primary or first source language.) Thus, "Escargot braised in white wine with spring greens" is referred to herein as a multi-lingual word string with text of a secondary source (French) language. By touching the French word "Escargot," a balloon with a translation "Улитка" in a target language (i.e., Russian) appears. Also, there is an indication that the word "Escargot" is from French ("фp. 708"). A user does not need to preliminarily specify a source language for receiving a correct translation.

Figure 7B:
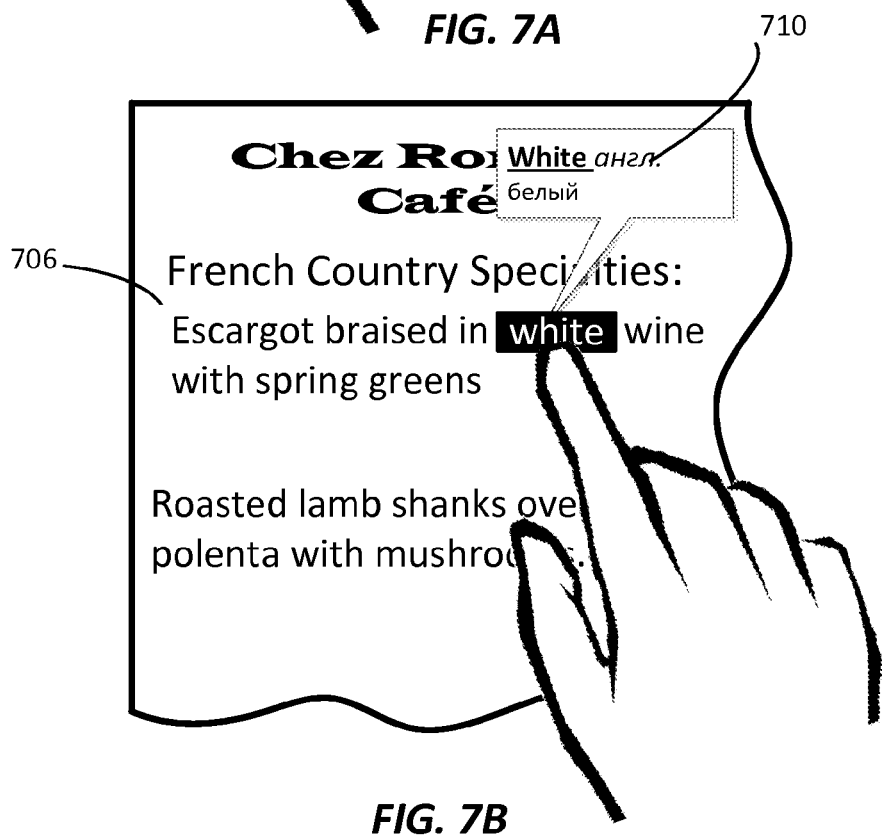

Referring to FIG. 7B, by touching the English word "white" the balloon with the translation "белый" in a target language (i.e., Russian) appears. Also there is a sign that the word "white" is from English ("англ" 710). A user does not need to preliminarily specify a source language before translating.

Figure 8A:
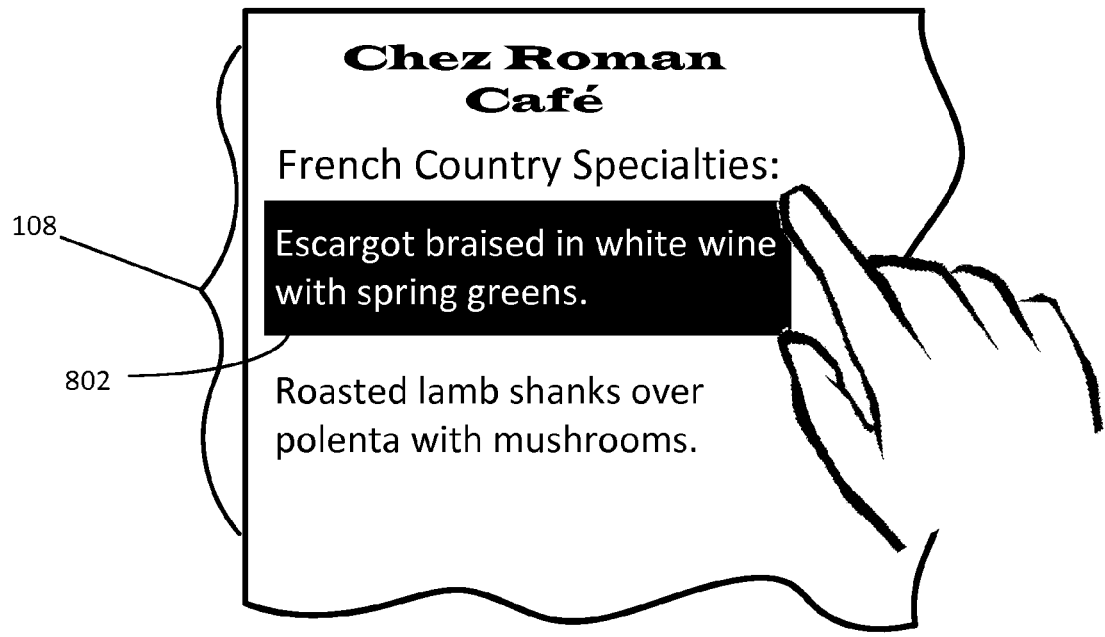
FIGS. 8A and 8B show a mechanism of translation to a third language (Russian) of the selected multi-lingual word string or combination while retaining a word in a secondary language (French).
Figure 8B:

FIG. 8A shows an original image with text 108 containing the multi-lingual (French and English) word combination 802 ("Escargot braised in white wine with spring greens") from FIGS. 7A and 7B which is selected by the user for translation. FIG. 8B shows the translation of the multi-lingual (French and English) word combination into Russian 804 ("тушеная в белом вине с зеленой капустой" a correct translation in English being "braised in white wine with spring greens"). Previous translation systems would fail to translate the French word "escargot". Alternatively, the displayed translation is shown with the secondary language word in the source langue along with some indication to attract the user's attention. The user could then touch the un-translated word to obtain the translation. This may be done to preserve the original meaning of the author embodied in the multi-lingual text. In the example of FIG. 8A, the word escargot carries meaning that is beyond just "snails." Thus, it is preferable to separate words from a secondary or tertiary source language and indicate them to the user when making a translation into a target language. The software application recognizes such words and expressions and indicates them accordingly.

Figure 9:
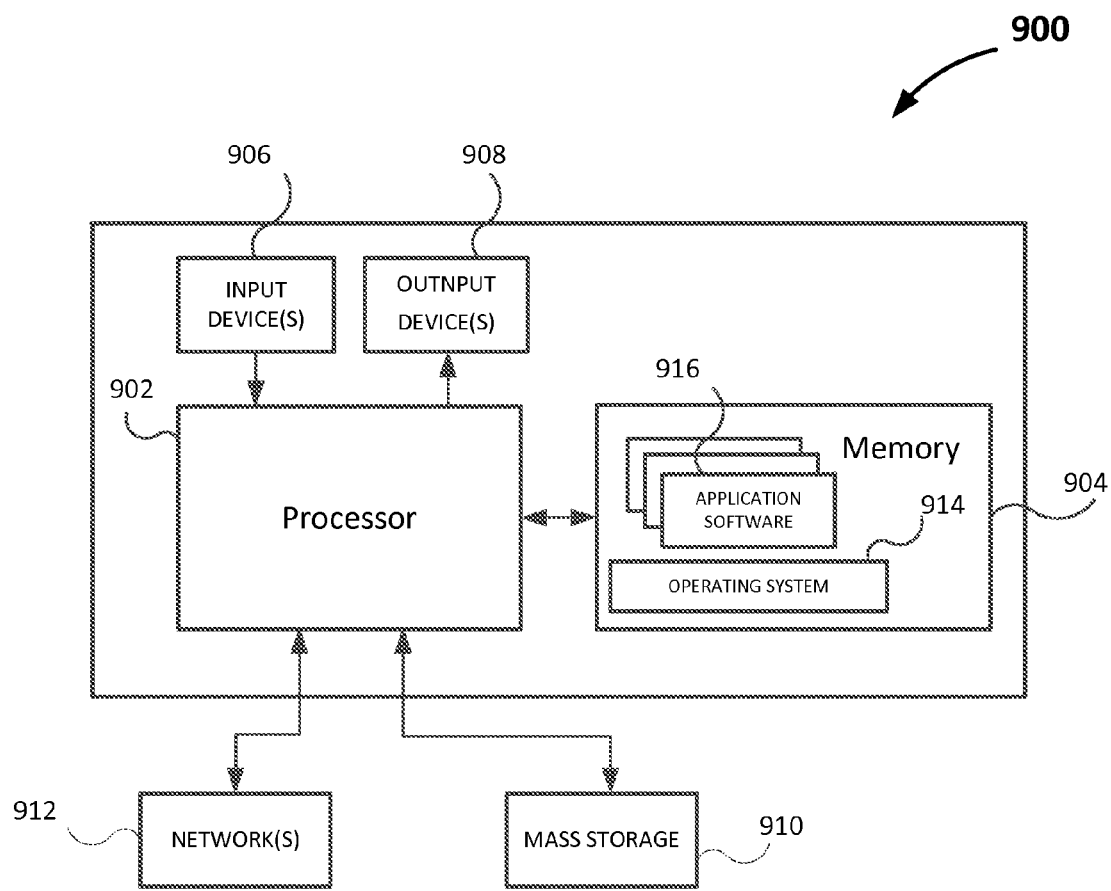
FIG. 9 shows an exemplary hardware for implementing methods such as those described herein on an electronic device.

FIG. 9 shows hardware 900 that may be used to implement the electronic device 102 in accordance with one embodiment of the invention. Referring to FIG. 9, the hardware 900 typically includes at least one processor 902 coupled to a memory 904 and having a touch screen 908 among output devices which in this case also serves as an input device 906. The processor 902 may be any commercially available CPU. The processor 902 may represent one or more processors (e.g., microprocessors), and the memory 904 may represent random access memory (RAM) devices comprising a main storage of the hardware 900, as well as any supplemental levels of memory, e.g., cache memories, non-volatile or back-up memories (e.g., programmable or flash memories), read-only memories, etc. In addition, the memory 904 may be considered to include memory storage physically located elsewhere in the hardware 900, e.g., any cache memory in the processor 902 as well as any storage capacity used as a virtual memory, e.g., as stored on a mass storage device 910.

The hardware 900 also typically receives a number of inputs and outputs for communicating information externally. For interface with a user or operator, the hardware 900 usually includes one or more user input devices 906 (e.g., a keyboard, a mouse, imaging device, scanner, etc.) and a one or more output devices 908 (e.g., a Liquid Crystal Display (LCD) panel, a sound playback device (speaker). To embody the present invention, the hardware 900 must include at least one touch screen device (for example, a touch screen), an interactive whiteboard or any other device which allows the user to interact with a computer by touching areas on the screen.

For additional storage, the hardware 900 may also include one or more mass storage devices 910, e.g., a floppy or other removable disk drive, a hard disk drive, a Direct Access Storage Device (DASD), an optical drive (e.g., a Compact Disk (CD) drive, a Digital Versatile Disk (DVD) drive, etc.) and/or a tape drive, among others. Furthermore, the hardware 900 may include an interface with one or more networks 912 (e.g., a local area network (LAN), a wide area network (WAN), a wireless network, and/or the Internet among others) to permit the communication of information with other computers coupled to the networks. It should be appreciated that the hardware 900 typically includes suitable analog and/or digital interfaces between the processor 902 and each of the components 904, 906, 908, and 912 as is well known in the art.

The hardware 900 operates under the control of an operating system 914, and executes various computer software applications 916, components, programs, objects, modules, etc. to implement the techniques described above. In particular, the computer software applications will include the client dictionary application and also other installed applications for displaying text and/or text image content such a word processor, dedicated e-book reader etc. in the case of the client user device 102. Moreover, various applications, components, programs, objects, etc., collectively indicated by reference 916 in FIG. 9, may also execute on one or more processors in another computer coupled to the hardware 900 via a network 912, e.g., in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash memory, etc.), among others. Another type of distribution may be implemented as Internet downloads.

While certain exemplary embodiments have been described and shown in the accompanying drawings, it is to be understood that such embodiments are merely illustrative and not restrictive of the broad invention and that this invention is not limited to the specific constructions and arrangements shown and described. Various other modifications should occur to those of ordinarily skilled in the art upon studying this disclosure. The disclosed embodiments may be readily modifiable in arrangement and detail as facilitated by subsequent advancements in various technologies without departing from the principals of the present disclosure.

For purposes of explanation, numerous specific details are set forth in order to provide an understanding of the invention. It should be apparent, however, to one skilled in the art that the invention can be practiced without these specific details. In other instances, structures and devices are shown only in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

I claim:

1. An electronic apparatus configured to translate words into a target language, the electronic apparatus comprising:
   an electronic display;
   an electronic processor; and
   instructions to cause the electronic apparatus to:
     acquire an image of text;
     detect a selection of a word or word combination in the image to be translated;
     perform optical character recognition (OCR) on the selected word or word combination using a character alphabet of a plurality of languages;
     generate a set of recognition variants for each word of the selected word or word combination;
     transmit each set of recognition variants to a set of language specific processors;
     eliminate language inappropriate variants from the set of recognition variants for each language, wherein the language inappropriate variants are the recognition variants which do not contain characters or symbols of the language;
     match each of remaining variants to a source language, wherein the remaining variants are the recognition variants minus the language inappropriate variants;
     confirm that at least one of the remaining variants is in at least one language specific word list;
     translate a confirmed word variant using a translation dictionary; and
     provide a translation of the confirmed word variant.

2. The electronic apparatus of claim 1, wherein the instructions further cause the apparatus to:
   display proposed words from the language specific word list based on an unconfirmed recognition variant;
   detect selection of a proposed word or correction of a variant; and
   provide a translation of the proposed word or correction of the variant.

3. The electronic apparatus of claim 1, wherein said matching of each of the remaining variants to a source language includes:
   matching language specific characters to the source language.

4. The electronic apparatus of claim 1, wherein said eliminating language inappropriate variants from the set of recognition variants includes:
   eliminating an inappropriate variant based on detection of a language inconsistent character.

5. The electronic apparatus of claim 1, wherein the instructions further cause the electronic apparatus to:
   prior to detecting the selection of a word or word combination in the image, perform OCR on a portion of the image of text to generate recognized words;
   locate recognized words in monolingual dictionaries;
   generate hypotheses about one or more source languages of the text;
   rank hypotheses based on a frequency of each language's use in the text; and
   limit, based on the ranked hypotheses, the character alphabet of a plurality of languages used in the OCR of the selected word or word combination.

6. The electronic apparatus of claim 1, wherein the instructions further cause the electronic apparatus to:
   prior to detecting the selection of a word or word combination in the image, establish a geo-location position of the electronic apparatus;
   identify a region or country based on the geo-location position;
   determine one or more preferred languages for the identified region or country;
   generate a ranked list of preferred languages for the region or country; and limit the character alphabet of a plurality of languages used in the OCR of the selected word or word combination.

7. The electronic apparatus of claim 1, wherein the instructions further cause the electronic apparatus to:
display a translation of a multi-lingual word string with text of a secondary language in its original form; and
emphasize the word or words of the multi-lingual word string that are in the secondary language.

8. The electronic apparatus of claim 7, wherein the instructions further cause the electronic apparatus to:
detect a selection on the emphasized word or words in the secondary language; and
translate the selected emphasized word or words into a target language.

9. The electronic apparatus of claim 1, wherein the instructions further cause the electronic apparatus to:
display proposed words from the language specific word list where the proposals are based on similarity of spelling with a desired word or word combination to be translated;
detect a selection of a proposed word or correction of a variant; and
provide a translation of the proposed word or correction of the variant.

10. A computer-implemented method for translating user selected words without preliminarily specifying a source language of translation, the method comprising:
acquiring an electronic image of text;
detecting a selection of a word or word combination in the image to be translated;
performing optical character recognition (OCR) on the selected word or word combination using a character alphabet of a plurality of languages;
generating a set of recognition variants for each word of the selected word or word combination;
transmitting each set of recognition variants to a set of language specific processors;
eliminating language inappropriate variants from the set of recognition variants for each language at least by matching characters in a variant with alphabetic characters of the language specific processors;
matching each of the remaining variants to a dictionary;
translating a word variant using a translation dictionary; and
providing a translation of the word variant.

11. The computer-implemented method of claim 10, wherein the method further comprises:
displaying proposed words from the language specific word list where the proposals are based on similarity of spelling with a desired word or word combination to be translated;
detecting selection of a proposed word or correction of a variant; and
providing a translation of the proposed word or correction of the variant.

12. The computer-implemented method of claim 10, wherein said matching of each of the remaining variants to a specific language dictionary includes:
identifying remaining variants in the dictionary of the language based on a language specific processor.

13. The computer-implemented method of claim 10, wherein said eliminating language inappropriate variants from the set of recognition variants includes:
eliminating an inappropriate variant based on detection of a language inconsistent character.

14. The computer-implemented method of claim 10, wherein the method further comprises:
prior to detecting the selection of a word or word combination in the image, performing OCR on a portion of the image of text to generate recognized words;
searching for the recognized words in monolingual dictionaries;
generating hypotheses about one or more source languages of the text;
ranking hypotheses based on a frequency of each language's use in the text; and
using the ranked hypotheses to limit the character alphabet of a plurality of languages used in the OCR of the selected word or word combination.

15. The computer-implemented method of claim 10, wherein the method further comprises:
prior to detecting the selection of a word or word combination in the image, establishing a geo-location position of the electronic apparatus;
identifying a region or country based on the geo-location position;
determining one or more preferred languages for the identified region or country;
generating a ranked list of preferred languages for the region or country; and
limiting the character alphabet of a plurality of languages used in the OCR of the selected word or word combination.

16. The computer-implemented method of claim 10, wherein acquiring an electronic image of text includes using a camera of the electronic device or accessing the electronic image of text from a memory storage of an electronic device.

17. The computer-implemented method of claim 10, wherein the recognized variants represent a word, word combination, abbreviation or hieroglyph, and wherein the recognized variants include characters recognized as a group.

18. The computer-implemented method of claim 10, wherein the method further comprises:
displaying a translation of a multi-lingual word string with text of a secondary language in its original form; and
emphasizing the word or words of the multi-lingual word string that are in the secondary language.

19. The computer-implemented method of claim 10, wherein the method further comprises:
detecting a selection on the emphasized word or words in the secondary language; and
translating the selected emphasized word or words into a target language.

* * * * *